(12) United States Patent
Chandran et al.

(10) Patent No.: US 12,461,847 B2
(45) Date of Patent: Nov. 4, 2025

(54) SYSTEMS AND METHODS FOR GENERATING VIRTUALIZED API ENDPOINTS

(71) Applicant: Capital One Services, LLC, McLean, VA (US)

(72) Inventors: Abhilash Chandran, Mckinney, TX (US); Jonathan Reyes, Dallas, TX (US)

(73) Assignee: Capital One Services, LLC, McLean, VA (US)

( * ) Notice: Subject to any disclaimer, the term of this patent is extended or adjusted under 35 U.S.C. 154(b) by 241 days.

(21) Appl. No.: 18/320,457

(22) Filed: May 19, 2023

(65) Prior Publication Data

US 2024/0385948 A1 Nov. 21, 2024

(51) Int. Cl.
*G06F 11/3698* (2025.01)
*G06F 8/36* (2018.01)

(52) U.S. Cl.
CPC .......... *G06F 11/3698* (2025.01); *G06F 8/36* (2013.01)

(58) Field of Classification Search
CPC ............................ G06F 11/3698; G06F 8/36
USPC .................................................. 717/120–140
See application file for complete search history.

(56) References Cited

U.S. PATENT DOCUMENTS

| 8,577,914 | B2 * | 11/2013 | Hossain | G06F 16/951 |
| | | | | 707/769 |
| 8,819,383 | B1 * | 8/2014 | Jobanputra | G06F 3/061 |
| | | | | 711/201 |
| 9,104,525 | B2 * | 8/2015 | Dang | G06F 8/75 |
| 9,130,860 | B1 * | 9/2015 | Boe | G06F 16/248 |
| 10,133,650 | B1 * | 11/2018 | Park | G06F 11/3684 |
| 10,705,942 | B1 | 7/2020 | Jha et al. | |
| 10,754,628 | B2 * | 8/2020 | Hernan | G06F 8/73 |
| 10,885,021 | B1 * | 1/2021 | Llorca | G06F 16/252 |
| 11,729,213 | B2 * | 8/2023 | Hebert | G06F 21/54 |
| | | | | 726/23 |
| 12,242,892 | B1 * | 3/2025 | Burnett | G06F 9/4881 |
| 2015/0363171 | A1 | 12/2015 | Esfahany et al. | |

(Continued)

OTHER PUBLICATIONS

Singjai et al, "Patterns on Deriving APIs and their Endpoints from Domain Models", ACM, pp. 1-15 (Year: 2121).*

(Continued)

*Primary Examiner* — Anil Khatri
(74) *Attorney, Agent, or Firm* — Foley & Lardner LLP

(57) ABSTRACT

Systems and methods for generating virtualized application programming interface (API) endpoints. In some aspects, the system, in response to receiving a user request to generate a virtualized API endpoint for an API, generates a template data structure for a request to the API based on initial metadata for the API. The system, based on the template data structure, generates the virtualized API endpoint for the API. The system, in response to receiving a user request to deploy the API in a test environment, retrieves updated metadata for the API from an API source repository. The system compares the updated metadata to the initial metadata to determine whether there is a difference greater than a threshold. The system, in response to determining that the difference is not greater than the threshold, returns a static response to a request to the API based on the virtualized API endpoint.

20 Claims, 4 Drawing Sheets

(56) References Cited

U.S. PATENT DOCUMENTS

| | | | |
|---|---|---|---|
| 2017/0237760 A1* | 8/2017 | Holeman | H04L 43/026 |
| | | | 726/22 |
| 2018/0173511 A1 | 6/2018 | Kozlowski | |
| 2019/0007366 A1* | 1/2019 | Voegele | H04L 61/4511 |
| 2021/0216443 A1 | 7/2021 | Park et al. | |
| 2021/0240600 A1 | 8/2021 | Larosa et al. | |
| 2022/0158926 A1* | 5/2022 | Wennerström | H04L 41/0853 |

OTHER PUBLICATIONS

Ananthakrishanan et al, "Enabling Remote Management of FaaS Endpoints with Globus Compute Multi-User Endpoints", ACM, pp. 1-5 (Year: 2024).*

Cho et al, "An Integrated Management System of Virtual Resources based on Virtualization API and Data Distribution Service", ACM, pp. 1-7 (Year: 2007).*

Yu et al, "AvA: Accelerated Virtualization of Accelerators", ACM, pp. 1-19 (Year: 2020).*

Dey et al, "Vagabond: Dynamic Network Endpoint Reconfiguration in Virtualized Environments", ACM, pp. 1-13 (Year: 2014).*

International Search Report and Written Opinion on PCT Appl. Ser. No. PCT/US2024/025721 Dated Aug. 9, 2024 (10 pages).

* cited by examiner

SYSTEMS AND METHODS FOR GENERATING VIRTUALIZED API ENDPOINTS

SUMMARY

Deploying application programming interfaces (APIs) directly into production environments without proper testing and validation can be risky and can result in various issues that can negatively impact the end-users and the overall system's performance. For example, deploying APIs directly into production without proper testing can lead to issues such as bugs, errors, and crashes, which can significantly affect the user experience. In some instances, APIs can contain sensitive information and may require access to protected resources. Deploying APIs directly into production environments can create security risks if proper security measures, such as authentication and authorization, are not put in place to protect the APIs and the resources they access. In other instances, if APIs are not adequately tested in a staging environment, issues with scalability and performance can occur, which can negatively impact the user experience. Further, APIs may rely on specific versions of third-party libraries, databases, or other software components. Deploying APIs directly into production environments can create compatibility issues if the production environment has a different configuration than the one in which the API was developed. These technical problems may present an inherent problem with attempting to use one or more new APIs.

Accordingly, methods and systems are described herein for virtualizing API endpoints for use in testing environments. As one example, methods and systems are described herein for enabling developers to test a new API without requiring the API to be put into a production environment. This involves a process for automated virtualization for the API to develop a virtualized API endpoint to be used for testing purposes. In some embodiments, a virtualized API endpoint is a simulated version of a real API endpoint that allows developers to test their applications without actually making live requests to the real API. This can be useful in a number of scenarios, such as when the real API is not yet available, when the developer needs to test edge cases or error handling, or when the real API has usage restrictions or costs associated with it. In a virtualized API endpoint, responses are generated by a mock server that emulates the behavior of the real API, based on predefined scenarios or data. Developers can interact with the virtualized endpoint using the same API client libraries and tools they would use with the real API, making it easier to test and debug their code.

Existing systems do not provide for developers to automatically receive virtualized API endpoints to test APIs before releasing them into a production environment. To overcome these technical deficiencies in existing systems for this practical benefit, methods and systems disclosed herein retrieve metadata for an API from an API source, generate a template data structure for a request for the API based on the metadata, and virtualize an endpoint for the API to generate a virtualized API endpoint. When the virtualized API endpoint is used for testing purposes, before execution the system may retrieve a latest copy of the API metadata to confirm whether the virtualized API endpoint needs to be regenerated in response to any updates to the API metadata. For example, the system may, in response to receiving a first user request to generate a first virtualized API endpoint for an API, based on initial metadata for the API, generate a template data structure for a request to the API, and based on the template data structure, generate the first virtualized API endpoint for the API. By generating a template data structure, the system can automate the process of generating up-to-date virtualized API endpoints for each API present in an API repository. For example, the template data structure allows the platform to pull data from the data structure directly instead of requiring a user to manually enter it. Accordingly, the methods and systems provide allowing users to quickly explore and invoke APIs with virtualized API endpoints suitable for testing purposes.

In some aspects, the problems described above may be solved using a system that may perform the following operations. The system in response to receiving a first user request to generate a first virtualized API endpoint for a first API, based on initial metadata for the first API, may generate a template data structure for a request to the first API. The system based on the template data structure, may generate the first virtualized API endpoint for the first API. The system in response to receiving a second user request to deploy the first API in a test environment, may retrieve, from the API source repository, updated metadata for the first API. The system may then compare the updated metadata to the initial current metadata to determine whether there is a difference greater than a threshold. Finally, the system in response to determining that the difference is not greater than the threshold, based on the first virtualized API endpoint, may return a static response to a request to the first API from within the test environment.

The system may generate a template data structure. In particular, the system in response to receiving a first user request to generate a first virtualized API endpoint for a first API, based on initial metadata for the first API, may generate a template data structure for a request to the first API. For example, after receiving a first user request, the system may retrieve the user-selected API. After that, the system may extract metadata from the API. The system may generate a template data structure based on the metadata from the API to automatically virtualize an API endpoint. Thus, the system may automatically generate virtualized API endpoints from a user request without further user input.

The system may generate a virtualized API endpoint. In particular, the system based on the template data structure, may generate the first virtualized API endpoint for the first API. For example, the system may retrieve the data needed for the template data structure to generate a first virtualized API endpoint. For example, a developer may want to test a weather API. The template data structure may store the type of features within the API. Based on the type of features, the system is able to generate a virtualized API endpoint. Thus, the system may generate virtualized API endpoints based on the types of features present in the API.

The system may retrieve updated metadata. In particular, the system in response to receiving a second user request to deploy the first API in a test environment, may retrieve, from an API source repository, updated metadata for the first API. For example, another developer at the same time as the first developer may decide to test the API. After receiving the request, the system may check if the API has been updated since the first request. Thus, the system is able to generate virtualized endpoints based on the latest version of the API.

The system may compare the updated metadata to the initial metadata. In particular, the system may compare the updated metadata to the initial metadata to determine whether there is a difference greater than a threshold. For example, the system may search the metadata for any major updates. If there are no major updates, the system may return the first virtualized endpoint. If there are major updates, the system may generate a new virtualized endpoint for the API. Thus, the system is able to determine whether there are any major updates to the API based on a threshold.

The system may return a static response. In particular, the system in response to determining that the difference is not greater than the threshold, based on the first virtualized API endpoint, may return a static response to a request to the first API from within the test environment. For example, the system may return the weather in the area based on the weather API. Therefore, the system allows developers to test APIs and receive a static response without putting the API in production.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
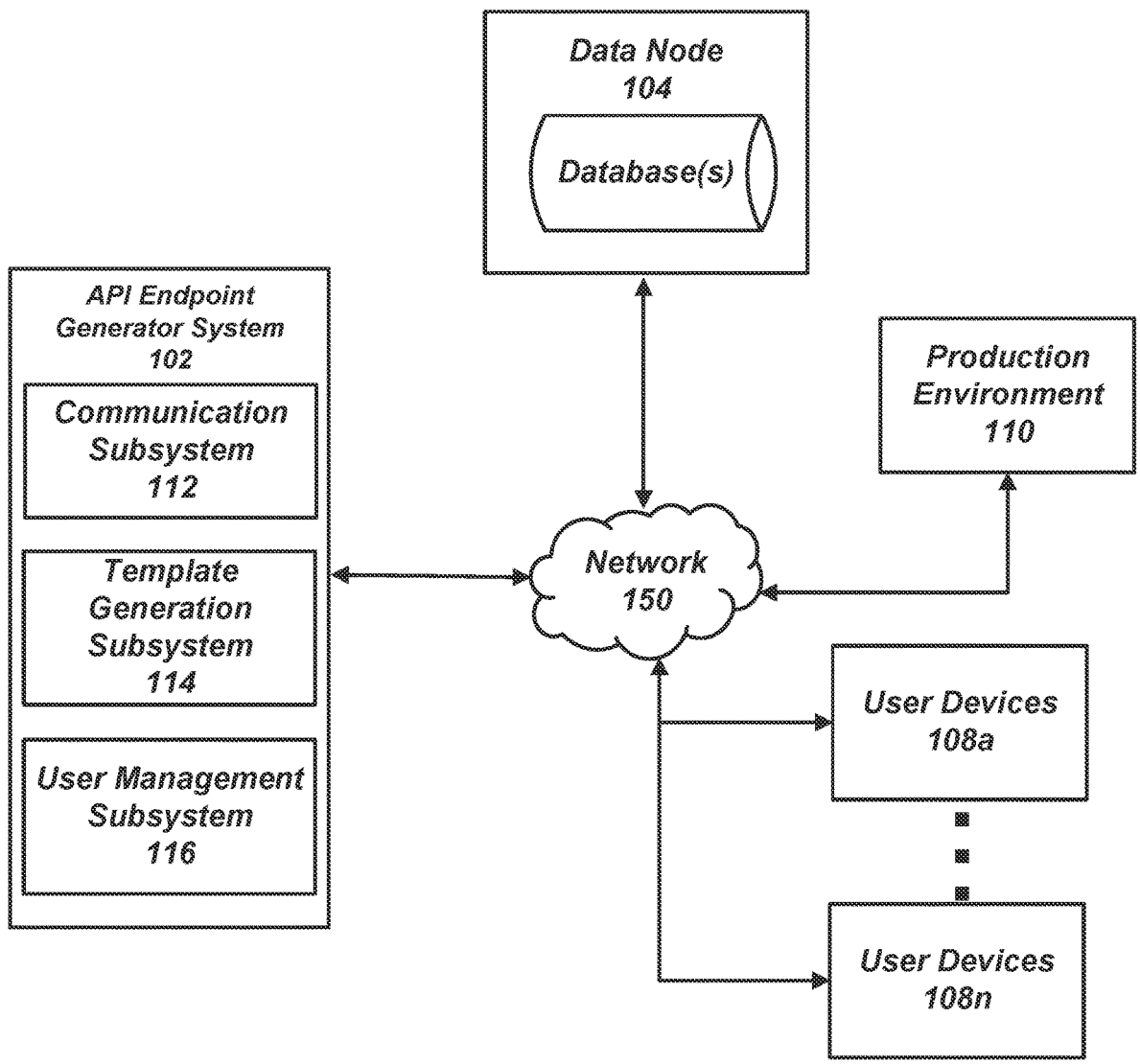
FIG. 1 shows an illustrative diagram for generating virtualized application programming interface (API) endpoints for test environments, in accordance with one or more embodiments.

FIG. 1 shows an illustrative environment for generating virtualized application programming interface (API) endpoints for test environments, in accordance with one or more embodiments of this disclosure. Environment 100 includes API endpoint generator system 102, data node 104, client devices 108a-108n, and production environment 110.

API endpoint generator system 102 may include software, hardware, or a combination of both and may reside on a physical server or a virtual server running on a physical computer system (e.g., centralized server 202 described with respect to FIG. 2A). In some embodiments, API endpoint generator system 102 may be configured on a user device (e.g., a laptop computer, a smartphone, a desktop computer, an electronic tablet, or another suitable user device). Furthermore, API endpoint generator system 102 may reside on a cloud-based system and/or interface with computer models either directly or indirectly, for example, through network 150. API endpoint generator system 102 may include communication subsystem 112, template generation subsystem 114, and/or user management subsystem 116.

Data node 104 may store various data, including one or more machine learning models, training data, user data profiles, input data, output data, performance data, and/or other suitable data. Data node 104 may include software, hardware, or a combination of the two. In some embodiments, API endpoint generator system 102 and data node 104 may reside on the same hardware and/or the same virtual server or computing device. Network 150 may be a local area network, a wide area network (e.g., the Internet), or a combination of the two.

Client devices 108a-108n may include software, hardware, or a combination of the two. For example, each client device may include software executed on the device or may include hardware such as a physical device. Client devices may include user devices (e.g., a laptop computer, a smartphone, a desktop computer, an electronic tablet, or another suitable user device).

Production environment 110 may include software, hardware, or a combination of the two. For example, the production environment may include software executed on hardware such as a physical device. In some embodiments, API endpoint generator system 102 and production environment 110 may reside on the same hardware and/or the same virtual server or computing device.

API endpoint generator system 102 may receive user requests from one or more client devices. API endpoint generator system 102 may receive data using communication subsystem 112, which may include software components, hardware components, or a combination of both. For example, communication subsystem 112 may include a network card (e.g., a wireless network card and/or a wired network card) that is associated with software to drive the card and enables communication with network 150. In some embodiments, communication subsystem 112 may also receive data from and/or communicate with data node 104 or another computing device. Communication subsystem 112 may receive data, such as metadata about the API. Communication subsystem 112 may communicate with template generation subsystem 114 and user management subsystem 116.

API endpoint generator system 102 may include template generation subsystem 114. Communication subsystem 112 may pass at least a portion of the data or a pointer to the data in memory to template generation subsystem 114. Template generation subsystem 114 may include software components, hardware components, or a combination of both. For example, template generation subsystem 114 may include software components that are able to execute operations for generating and processing a template data structure for the API. Template generation subsystem 114 may access data, such as metadata about the API. Template generation subsystem 114 may directly access data or nodes associated with client devices 108a-108n and may transmit data to these client devices. Template generation subsystem 114 may, additionally or alternatively, receive data from and/or send data to communication subsystem 112 and user management subsystem 116.

User management subsystem 116 may execute tasks relating to managing the amount of users who have access to the API. User management subsystem 116 may include software components, hardware components, or a combination of both. For example, in some embodiments, user management subsystem 116 may receive a list of users. User management subsystem 116 may allow API endpoint generator system 102 to improve user management by automatically updating the list of users, in accordance with one or more embodiments. User management subsystem 116 may, additionally or alternatively, receive data from and/or send data to communication subsystem 112 or template generation subsystem 114.

Figure 2:
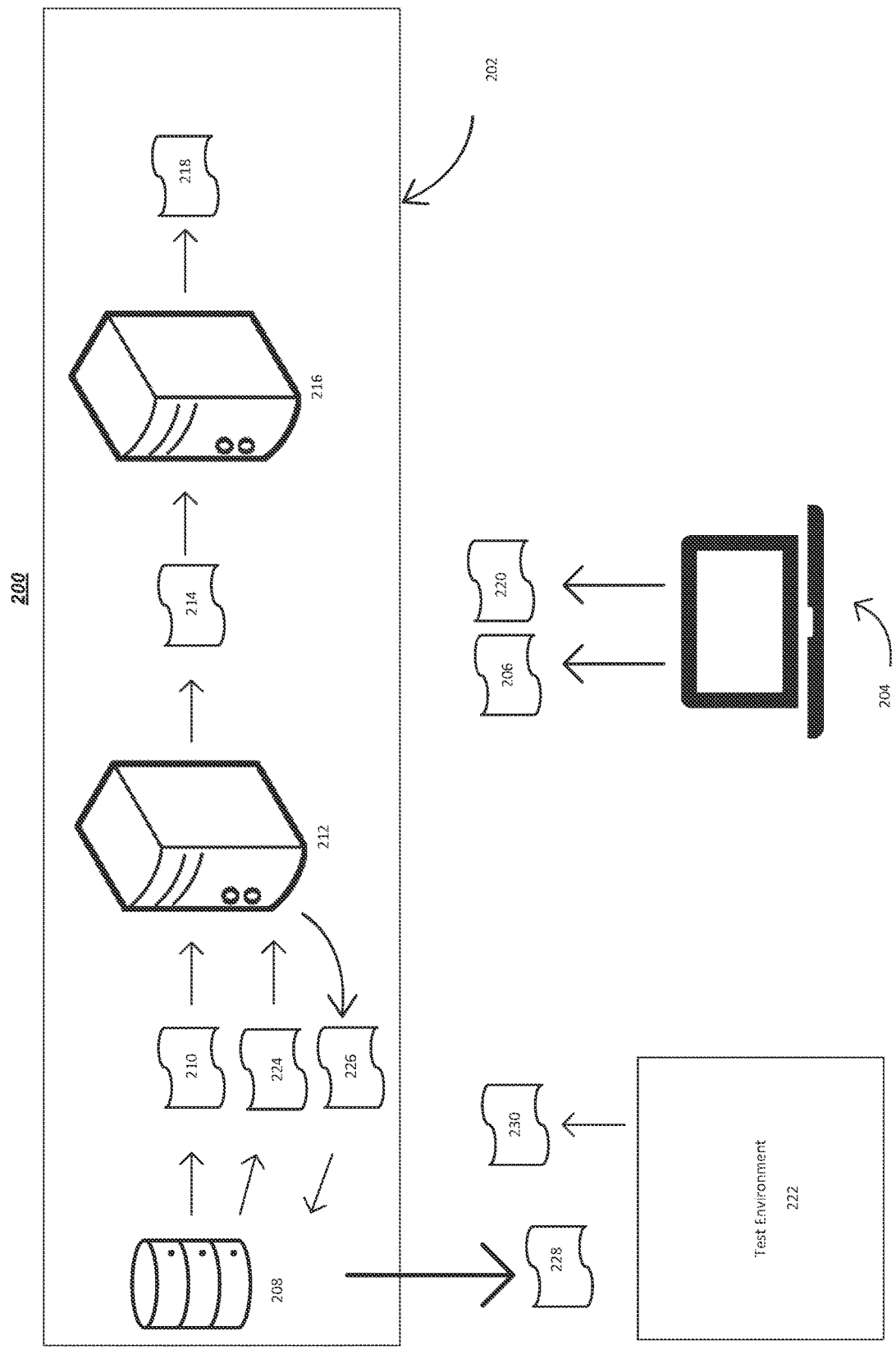
FIG. 2 shows an illustrative diagram for generating a template data structure for a request to the first API, in accordance with one or more embodiments.

FIG. 2 shows an illustrative diagram for generating a template data structure for a request to the first API, in accordance with one or more embodiments. FIG. 2 shows environment 200. Environment 200 includes centralized server 202, user device 204, user request 206, database 208, metadata 210, processor 212, template data structure 214, processor 216, API endpoint 218, user request 220, test environment 222, metadata 224, results 226, API 228, and static response 230.

Centralized server 202 may receive a user request. In particular, centralized server 202 in response to receiving a first user request (e.g., user request 206) to generate a first virtualized API endpoint (e.g., API endpoint 218) for a first API (e.g., API 228), based on initial metadata (e.g., metadata 210) for the first API, may generate a template data structure (e.g., template data structure 214) for a request to the first API. For example, after receiving user request 206, the system may retrieve the user-selected API from an API source repository (e.g., database 208). After that, the system may extract metadata from the API (e.g., metadata 210). The system may generate template data structure 214 based on metadata 210 corresponding to user-selected API to automatically virtualize an API endpoint (e.g., API endpoint 218). Thus, the system may automatically generate virtualized API endpoints from a user request without further user input.

In some embodiments, centralized server 202 may parse the initial metadata (e.g., metadata 210). In particular, when generating a template data structure for a request to the first API, centralized server 202 may parse the initial metadata (e.g., metadata 210) for the first API (e.g., API 228) for a Uniform Resource Locators (URL) endpoint and a JavaScript Object Notation (JSON) payload. For example, API 228 may include weather data. When generating a template data structure for API 228, the system may parse the metadata associated with API 228 for URL endpoint and JSON payload.

Centralized server 202 may generate a virtualized API endpoint (e.g., API endpoint 218). In particular, based on the template data structure, centralized server 202 may generate the first virtualized API endpoint (e.g., API endpoint 218) for the first API (e.g., API 228). For example, the system may retrieve the metadata (e.g., metadata 210) needed for template data structure 214 to generate API endpoint 218. For example, a developer may want to test a weather API. Template data structure 214 may store the type of features within API 228. Based on the type of features, the system is able to generate a virtualized API endpoint (e.g., API endpoint 218). Thus, the system may generate virtualized API endpoints based on the types of features present in the API.

Centralized server 202 may retrieve updated metadata (e.g., metadata 224). In particular, in response to receiving a second user request (e.g., user request 220) to deploy the first API (e.g., API 228) in a test environment (e.g., test environment 222), centralized server 202 may retrieve, from an API source repository (e.g., database 208), updated metadata (e.g., metadata 224) for the first API. For example, a second developer at the same time as the first developer may decide to test API 228. After receiving user request 220, the system may check if the metadata for API 228 has been updated since user request 206. Therefore, the system receives metadata 224 from the API source repository (e.g., database 208). Thus, the system is able to generate virtualized endpoints based on the latest version of the API.

Centralized server 202 may compare initial metadata (e.g., metadata 210) and updated metadata (e.g., metadata 224). In particular, centralized server 202 may compare the updated metadata (e.g., metadata 224) to the initial metadata (e.g., metadata 210) to determine whether there is a difference greater than a threshold. For example, the system may search the metadata for any major updates. If there are no major updates, the system may return the first virtualized endpoint. If there are major updates, the system may generate a new virtualized endpoint for the API. Therefore, database 208 sends metadata 224 to processor 212, and processor 212 sends results 226 to database 208. Results 226 may include a notification that metadata 210 was not updated. After receiving results 226, database 208 (e.g., API source repository) may send API 228 to test environment 222. Thus, the system is able to determine whether there are any major updates to the API based on a threshold.

Centralized server 202 may return a static response (e.g., static response 230). In particular, in response to determining that the difference is not greater than the threshold, based on the first virtualized API endpoint, centralized server 202 may return a static response (e.g., static response 230) to a request to the first API from within the test environment (e.g., test environment 222). For example, the system may return the weather in the area after testing on weather API in test environment 222. Therefore, the system allows developers to test APIs and receive a static response without putting the API in production.

In some embodiments, centralized server 202 may generate a second virtualized API endpoint. In particular, when determining that the difference is greater than the threshold, centralized server 202 based on the updated metadata, may generate an updated template data structure for a request to the first API (e.g., API 228). Then, based on the updated template data structure, centralized server 202 may generate a second virtualized API endpoint for the first API. For example, if processor 212 determines metadata 224 has a difference greater than the threshold when compared to metadata 210, then processor 216 generates a second virtualized API endpoint. Therefore, the system may ensure to update the API endpoint when needed.

In some embodiments, centralized server 202 may store each virtualized API endpoint (e.g., API endpoint 218). In particular, centralized server 202 may store each virtualized API endpoint for each API within an endpoint data repository. The endpoint data repository stores each API and a corresponding virtualized API endpoint. For example, the system may store API endpoint 218 in an endpoint data repository. By doing so, the system may always store the most recent API endpoint for each API.

In some embodiments, centralized server 202 may receive a time threshold. In particular, centralized server 202 may receive a time threshold. The time threshold may include an amount of time before automatically updating an endpoint data repository. For example, the time threshold may be set to three days. Every three days, the system automatically stores the API endpoint 218. By doing so, the system may persistently store API endpoints.

In some embodiments, centralized server 202 may remove an API endpoint (e.g., API endpoint 218). In particular, when determining that the difference is greater than the threshold, centralized server 202 may remove the first virtualized API endpoint from an endpoint data repository. For example, the system may remove API endpoint 218 from the endpoint data repository after generating another API endpoint. By doing so, the system may always store the most recent API endpoint for each API.

In some embodiments, centralized server 202 may receive a user request to deploy the API (e.g., API 228) in a production environment. In particular, centralized server 202 may receive a third user request to deploy the first API (e.g., API 228) in a production environment. In response to receiving the third user request, centralized server 202 may authenticate the first API for the production environment, by receiving, from the production environment, an access token, and transmitting the access token to the production environment. For example, the system may authenticate API 228 before deploying it to a production environment. By doing so, the system may automatically deploy API 228 to the production environment while maintaining the user's account is secure.

In some embodiments, centralized server 202 may generate a plurality of user accounts. In particular, centralized server 202 may receive, from the API source repository (e.g., database 208), a list of users associated with the first API (e.g., API 228). Centralized server 202 may transmit, to an API collection repository, the list of users associated with the first API (e.g., API 228). Centralized server 202 may generate a plurality of user accounts for each user on the list of users. By doing so, the system may ensure that the list of users for the API are synced between the API collection repository and the API source repository.

In some embodiments, centralized server 202 may remove a user account. In particular, centralized server 202 may detect a change in the list of users associated with the first API, by receiving, from the API source repository, an updated list of users. The updated list of users may include the list of users associated with the first API without users who have been removed. Centralized server 202 may transmit, to the API collection repository, the updated list of users. Centralized server 202 may remove a user account for a removed user. By doing so, the system may ensure that the list of users for the API are synced between the API collection repository and the API source repository.

In some embodiments, centralized server 202 may generate an API request collection repository. In particular, centralized server 202 may generate an API request collection repository. The API request collection repository may include each user request, a user account associated with each user request, and an API associated with each user request. By doing so, the system may store all user requests.

In some embodiments, centralized server 202 may generate a notification. In particular, when receiving, from a second user, a fourth user request to generate a new virtualized API endpoint for the first API, centralized server 202 may search an endpoint data repository for the new virtualized API endpoint. Then, centralized server 202 may detect an existing virtualized API endpoint (e.g., API endpoint 218). Finally, centralized server 202 may generate a notification, to the second user. The notification comprises a latest version of the first virtualized API endpoint for the first API. By doing so, the system may notify a user of an existing API endpoint.

Figure 3:
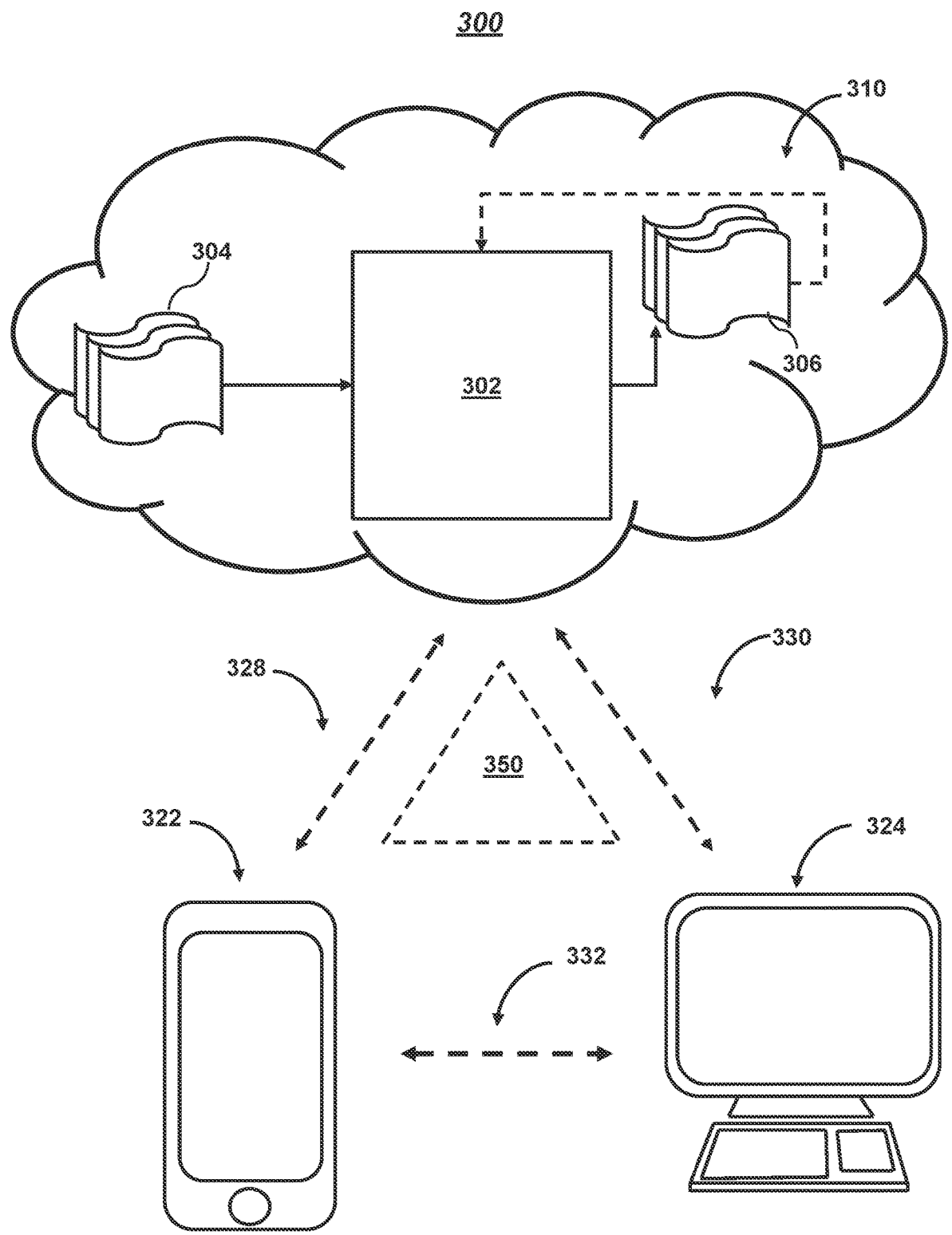
FIG. 3 shows illustrative components for a system used to generate virtualized application programming interface (API) endpoints for test environments, in accordance with one or more embodiments.

FIG. 3 shows illustrative components for a system used to generate virtualized application programming interface (API) endpoints for test environments, in accordance with one or more embodiments. For example, FIG. 3 may show illustrative components for allowing users to quickly explore and invoke APIs with virtualized API endpoints suitable for testing purposes. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc. . . . ) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include API endpoint generator system 102, communication subsystem 112, template generation subsystem 114, user management subsystem 116, data node 104, or client devices 108a-108n, and may be connected to network 150. Cloud components 310 may access API metadata from database 208.

Cloud components 310 may include program 302, which may be a machine learning model, artificial intelligence model, etc., (which may be referred to collectively as "models" herein). Program 302 may take input 304 and provide output 306. The input may include metadata about an API. The metadata may include information about the API. The output may include a template data structure. The template data structure may include the type of data needed for the API. In some embodiments, output 306 may be fed back to program 302 as another input to program 302 (e.g., alone or in conjunction with other inputs such as information from the API source repository). For example, the system may receive updated metadata from the API source repository to generate an updated template data structure.

In another embodiment, program 302 may receive a user request to generate a virtualized API endpoint for the API (e.g., input 304). Program 302 may generate a static response to the request (e.g., output 306). In a variety of embodiments, program 302 may update its configurations (e.g., the virtualized API endpoint) based on updated metadata (e.g., input 304).

In some embodiments, the program (e.g., program 302) may automatically perform actions based on outputs 306. In some embodiments, the model (e.g., program 302) may not perform any actions. The output of the program (e.g., program 302) may be used to allow users to quickly explore and invoke APIs with virtualized API endpoints suitable for testing purposes.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of their operations and the data types used to exchange information. REST APIs do not typically have this contract; instead, they are documented with client libraries for most common languages, including Ruby, Java®, PHP, and JavaScript®. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
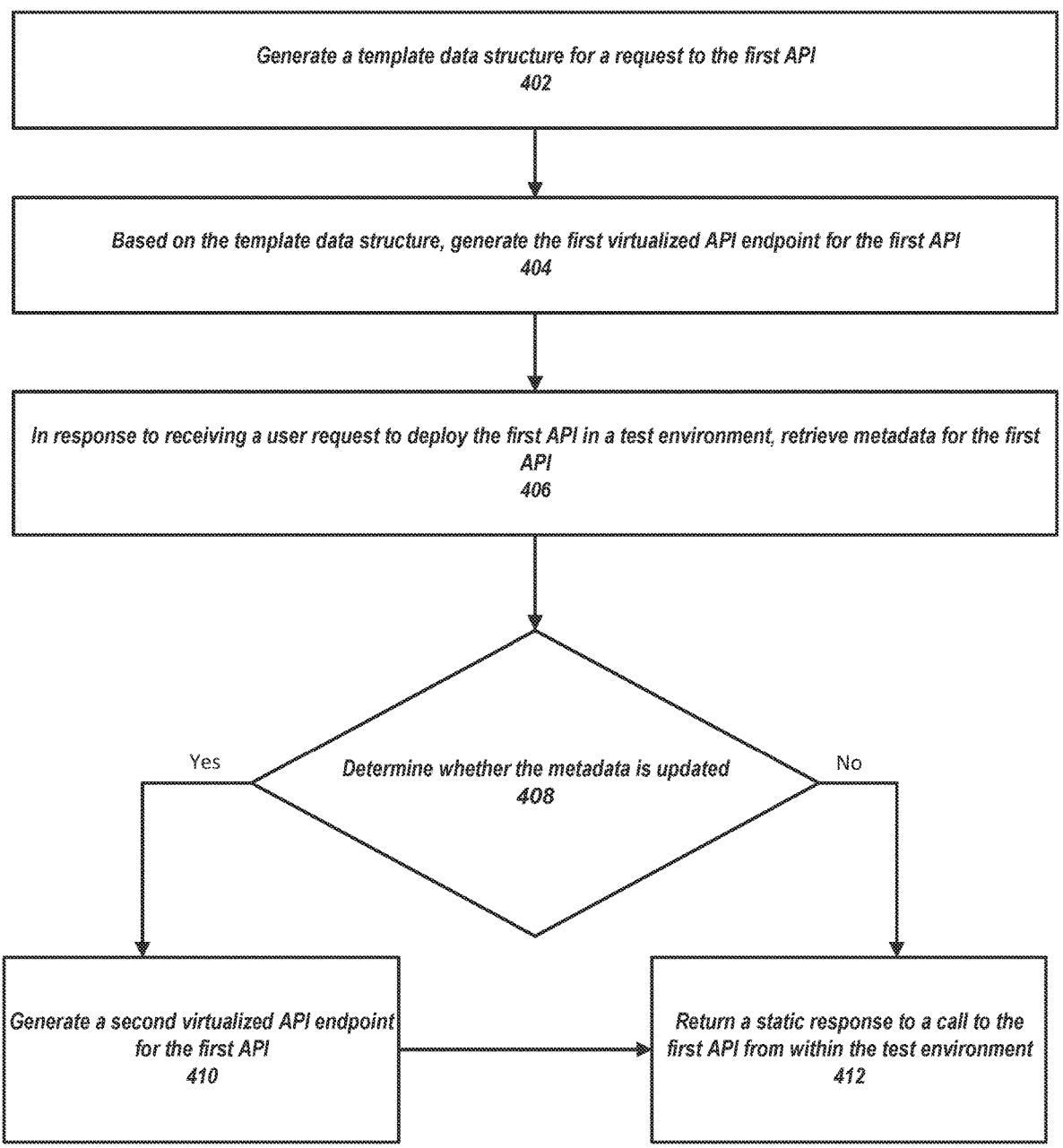
FIG. 4 shows a flowchart of the steps involved in generating virtualized application programming interface (API) endpoints for test environments, in accordance with one or more embodiments.

FIG. 4 shows a flowchart of the steps involved in generating virtualized API endpoints for a test environment, in accordance with one or more embodiments. For example, the system may use process 400 (e.g., as implemented on one or more system components described above) in order to allow users to quickly explore and invoke APIs with virtualized API endpoints suitable for testing purposes.

At operation 402, process 400 (e.g., using one or more components described above) may generate a template data structure for a request to the first API. For example, the system in response to receiving a first user request to generate a first virtualized API endpoint for a first API, based on initial metadata for the first API, may generate a template data structure for a request to the first API. For example, after receiving user request 206, communication subsystem 112 may retrieve the user-selected API from an API source repository (e.g., database 208) using communication paths 328, 330, and 332. After that, the system may extract metadata from the API (e.g., metadata 210). The system may generate template data structure 214 based on metadata 210 corresponding to the user-selected API to automatically virtualize an API endpoint (e.g., API endpoint 218). By doing so, the system may automatically generate virtualized API endpoints from a user request without further user input.

In some embodiments, centralized server 202 may parse the initial metadata (e.g., metadata 210). For example, when generating a template data structure for a request to the first API, centralized server 202 may parse the initial metadata (e.g., metadata 210) for the first API (e.g., API 228) for a Uniform Resource Locators (URL) endpoint and a JavaScript Object Notation (JSON) payload. For example, API 228 may include weather data. When generating a template data structure for API 228, template generation subsystem 114 may parse the metadata associated with API 228 for URL endpoint and JSON payload.

At operation 404, process 400 (e.g., using one or more components described above) based on the template data structure, may generate a first virtualized API endpoint (e.g., API endpoint 218) for the first API. For example, based on the template data structure, the system may generate the first virtualized API endpoint (e.g., API endpoint 218) for the first API (e.g., API 228). For example, the system may retrieve the metadata (e.g., metadata 210) needed from template data structure 214 to generate API endpoint 218. For example, a developer may want to test a weather API. Template data structure 214 may store the type of features within API 228. Based on the type of features, template generation subsystem 114 is able to generate a virtualized API endpoint (e.g., API endpoint 218). By doing so, the system may generate virtualized API endpoints based on the types of features present in the API.

At operation 406, process 400 (e.g., using one or more components described above) may in response to receiving a user request to deploy the first API in a test environment, may retrieve the metadata for the first API. For example, in response to receiving a second user request (e.g., user request 220) to deploy the first API (e.g., API 228) in a test environment (e.g., test environment 222), the system may retrieve, from an API source repository (e.g., database 208), updated metadata (e.g., metadata 224) for the first API. For example, a second developer at the same time as the first developer may decide to test API 228. After receiving user request 220, user management subsystem 116 may check if the metadata for API 228 has been updated since user request 206. Therefore, the system receives metadata 224 from the API source repository (e.g., database 208). By doing so, the system is able to generate virtualized endpoints based on the latest version of the API.

At operation 408, process 400 (e.g., using one or more components described above) may determine whether the metadata is updated. For example, centralized server 202 may compare the updated metadata (e.g., metadata 224) to the initial metadata (e.g., metadata 210) to determine whether there is a difference greater than a threshold. For example, communication subsystem 112 may search the metadata for any major updates. If there are no major updates, communication subsystem 112 may return the first virtualized endpoint. If there are major updates, the system may generate a new virtualized endpoint for the API. Therefore, database 208 sends metadata 224 to processor 212, and processor 212 sends results 226 to database 208. Results 226 may include a notification that metadata 210 was not updated. After receiving results 226, database 208 (e.g., API source repository) may send API 228 to test environment 222. By doing so, the system is able to determine whether there are any major updates to the API based on a threshold.

At operation 410, process 400 (e.g., using one or more components described above) may generate a second virtualized API endpoint for the first API. For example, when determining that the difference is greater than the threshold, template generation subsystem 114 based on the updated metadata, may generate an updated template data structure for a request to the first API (e.g., API 228). Then, based on the updated template data structure, centralized server 202 may generate a second virtualized API endpoint for the first API. For example, if processor 212 determines metadata 224 has a difference greater than the threshold when compared to metadata 210, then processor 216 generates a second virtualized API endpoint. By doing so, the system may ensure to update the API endpoint when needed.

At operation 412, process 400 (e.g., using one or more components described above) may return a static response to a call to the first API from within the test environment. For example, in response to determining that the difference is not greater than the threshold, based on the first virtualized API endpoint, centralized server 202 may return a static response (e.g., static response 230) to a call to the first API from within the test environment (e.g., test environment 222). For example, communication subsystem 112 may return the weather in the area after testing on weather API in test environment 222 using communication paths 328, 330, and 332. By doing so, the system allows developers to test APIs and receive a static response without putting the API in production.

In some embodiments, the system may store each virtualized API endpoint (e.g., API endpoint 218). For example, the system may store each virtualized API endpoint for each API within an endpoint data repository. The endpoint data repository stores each API and a corresponding virtualized API endpoint. For example, communication subsystem 112 may store API endpoint 218 in an endpoint data repository in data node 104. By doing so, the system may always store the most recent API endpoint for each API.

In some embodiments, the system may receive a time threshold. For example, centralized server 202 may receive a time threshold. The time threshold may include an amount of time before automatically updating an endpoint data repository. For example, the time threshold may be set to three days. Every three days, communication subsystem 112 automatically stores the API endpoint 218. By doing so, the system may persistently store API endpoints.

In some embodiments, the system may remove an API endpoint (e.g., API endpoint 218). For example, when determining that the difference is greater than the threshold, the system may remove the first virtualized API endpoint from an endpoint data repository. For example, communication subsystem 112 may remove API endpoint 218 from the endpoint data repository after generating another API endpoint. By doing so, the system may always store the most recent API endpoint for each API.

In some embodiments, the system may receive a user request to deploy the API (e.g., API 228) in a production environment. For example, the system may receive a third user request to deploy the first API (e.g., API 228) in a production environment. In response to receiving the third user request, the system may authenticate the first API for the production environment, by receiving, from the production environment, an access token, and transmitting the access token to the production environment. For example, communication subsystem 112 may authenticate API 228 before deploying it to a production environment using communication paths 328, 330, and 332. By doing so, the system may automatically deploy API 228 to the production environment while maintaining the security of the user's account.

In some embodiments, the system may generate a plurality of user accounts. For example, user management subsystem 116 may receive, from the API source repository (e.g., database 208), a list of users associated with the first API (e.g., API 228). Communication subsystem 112 may transmit, to an API collection repository, the list of users associated with the first API (e.g., API 228). User management subsystem 116 may generate a plurality of user accounts for each user on the list of users. By doing so, the system may ensure that the list of users for the API are synced between the API collection repository and the API source repository.

In some embodiments, the system may remove a user account. For example, user management subsystem 116 may detect a change in the list of users associated with the first API, by receiving, from the API source repository, an updated list of users. The updated list of users may include the list of users associated with the first API without users who have been removed. Communication subsystem 112 may transmit, to the API collection repository, the updated list of users. User management subsystem 116 may remove a user account for a removed user. By doing so, the system may ensure that the list of users for the API are synced between the API collection repository and the API source repository.

In some embodiments, the system may generate an API request collection repository. For example, user management subsystem 116 may generate an API request collection repository. The API request collection repository may include each user request, a user account associated with each user request, and an API associated with each user request. By doing so, the system may store all user requests.

In some embodiments, the system may generate a notification. For example, when receiving, from a second user, a fourth user request to generate a new virtualized API endpoint for the first API, template generation subsystem 114 may search an endpoint data repository for the new virtualized API endpoint. Then, template generation subsystem 114 may detect an existing virtualized API endpoint (e.g., API endpoint 218). Finally, communication subsystem 112 may generate a notification, to the second user using communication paths 328, 330, and 332. The notification comprises a latest version of the first virtualized API endpoint for the first API. By doing so, the system may notify a user of an existing API endpoint.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

Embodiment 1. A method comprising: receiving, from a first user, a first user request to generate a first virtualized API endpoint for a first API, wherein the first virtualized API endpoint returns a static response to a request to the first API from within a test environment; in response to receiving the first user request, retrieving, from an API source repository, initial metadata for the first API; based on the initial metadata, generating a template data structure for a request to the first API; based on the template data structure, generating the first virtualized API endpoint for the first API; receiving, from a second user, a second user request to deploy the first API in the test environment; in response to receiving the second user request, retrieving, from the API source repository, updated metadata for the first API; comparing the updated metadata to the initial metadata to determine whether there is a difference greater than a threshold; and in response to determining that the difference is greater than the threshold, based on the updated metadata, generating an updated template data structure for a request to the first API, and based on the updated template data structure, generating a second virtualized API endpoint for the first API.

Embodiment 2. A method comprising: in response to receiving a first user request to generate a first virtualized API endpoint for a first API, based on initial metadata for the first API, generating a template data structure for a request to the first API; based on the template data structure, generating the first virtualized API endpoint for the first API; in response to receiving a second user request to deploy the first API in a test environment, retrieving, from an API source repository, updated metadata for the first API; comparing the updated metadata to the initial metadata to determine whether there is a difference greater than a threshold; and in response to determining that the difference is not greater than the threshold, based on the first virtualized API endpoint, returning a static response to a request to the first API from within the test environment.

Embodiment 3. A method comprising in response to receiving a first user request to generate a first virtualized API endpoint for a first API, based on initial metadata for the first API, generating a template data structure for a request to the first API; based on the template data structure, generating the first virtualized API endpoint for the first API; and in response to receiving a second user request to deploy the first API in a test environment, based on the first virtualized API endpoint, returning a static response to a request to the first API from within the test environment.

Embodiment 4. The method of any one of the preceding embodiments, wherein determining that the difference is greater than the threshold further comprises: based on the updated metadata, generating an updated template data structure for a request to the first API, and based on the updated template data structure, generating a second virtualized API endpoint for the first API.

Embodiment 5. The method of any one of the preceding embodiments, wherein generating a template data structure for a request to the first API further comprises parsing the initial metadata for the first API for a Uniform Resource Locators (URL) endpoint and a JavaScript Object Notation (JSON) payload.

Embodiment 6. The method of any one of the preceding embodiments, further comprising: receiving a third user request to deploy the first API in a production environment; and in response to receiving the third user request, authenticating the first API for the production environment, comprising: receiving, from the production environment, an access token; and transmitting the access token to the production environment.

Embodiment 7. The method of any one of the preceding embodiments further comprises storing each virtualized API endpoint for each API within an endpoint data repository, wherein the endpoint data repository stores each API and a corresponding virtualized API endpoint.

Embodiment 8. The method of any one of the preceding embodiments, wherein determining that the difference is greater than the threshold further comprises removing the first virtualized API endpoint from an endpoint data repository.

Embodiment 9. The method of any one of the preceding embodiments, further comprising: receiving, from the API source repository, a list of users associated with the first API; transmitting, to an API collection repository, the list of users associated with the first API; and generating a plurality of user accounts for each user on the list of users.

Embodiment 10. The method of any one of the preceding embodiments, further comprising: detecting a change in the list of users associated with the first API, comprising: receiving, from the API source repository, an updated list of users, wherein the updated list of users comprises the list of users associated with the first API without users who have been removed; transmitting, to the API collection repository, the updated list of users; and removing a user account for a removed user.

Embodiment 11. The method of any one of the preceding embodiments further comprises generating an API request collection repository, wherein the API request collection repository comprises each user request, a user account associated with each user request, and an API associated with each user request.

Embodiment 12. The method of any one of the preceding embodiments further comprises receiving a time threshold, wherein the time threshold comprises an amount of time before automatically updating an endpoint data repository.

Embodiment 13. The method of any one of the preceding embodiments, wherein receiving, from a second user, a fourth user request to generate a new virtualized API endpoint for the first API further comprises: searching an endpoint data repository for the new virtualized API endpoint; detecting an existing virtualized API endpoint; and generating a notification, to the second user, wherein the notification comprises a latest version of the first virtualized API endpoint for the first API.

Embodiment 14. A tangible, non-transitory, machine-readable medium storing instructions that, when executed by a data processing apparatus, cause the data processing apparatus to perform operations comprising those of any of embodiments 1-13.

Embodiment 15. A system comprising one or more processors; and memory storing instructions that, when executed by the processors, cause the processors to effectuate operations comprising those of any of embodiments 1-13.

Embodiment 16. A system comprising means for performing any of embodiments 1-13.

What is claimed is:

1. A system for generating virtualized application programming interface (API) endpoints for test environments, comprising:
   one or more processors; and
   one or more non-transitory computer-readable media storing instructions that when executed by the one or more processors cause operations comprising:
   receiving, from a first user, a first user request to generate a first virtualized API endpoint for a first API, wherein the first virtualized API endpoint returns a static response to a call to the first API from within a test environment;
   in response to receiving the first user request, retrieving, from an API source repository, initial metadata for the first API;
   based on the initial metadata, generating a template data structure for the call to the first API;
   based on the template data structure, generating the first virtualized API endpoint for the first API;
   receiving, from a second user, a second user request to deploy the first API in the test environment;
   in response to receiving the second user request, retrieving, from the API source repository, updated metadata for the first API;
   comparing the updated metadata to the initial metadata to determine whether the updated metadata is updated based on whether there is a difference greater than a threshold;
   in response to determining that the difference is greater than the threshold:
   based on the updated metadata, generating an updated template data structure for the call to the first API, and
   based on the updated template data structure, generating a second virtualized API endpoint for the first API;
   receiving, from the API source repository, a list of users associated with the first API;
   transmitting, to an API collection repository, the list of users associated with the first API; and
   generating a plurality of user accounts for each user on the list of users.

2. The system of claim 1, wherein the instructions, when executed by the one or more processors, cause further operations comprising:
   detecting a change in the list of users associated with the first API, comprising:
   receiving, from the API source repository, an updated list of users, wherein the updated list of users comprises the list of users associated with the first API without users who have been removed;
   transmitting, to the API collection repository, the updated list of users; and
   removing a user account for a removed user.

3. The system of claim 1, wherein the instructions, when executed by the one or more processors, cause further operations comprising:
  in response to receiving a third user request to generate a new virtualized API endpoint for the first API:
    searching an endpoint data repository for the new virtualized API endpoint;
    detecting an existing virtualized API endpoint; and
    generating a notification, to the third user request, that comprises a latest version of the first virtualized API endpoint for the first API.

4. A method for generating virtualized application programming interface (API) endpoints for test environments, comprising:
  in response to receiving a first user request to generate a first virtualized API endpoint for a first API, based on initial metadata for the first API, generating a template data structure for a call to the first API;
  based on the template data structure, generating the first virtualized API endpoint for the first API;
  in response to receiving a second user request to deploy the first API in a test environment, retrieving, from an API source repository, updated metadata for the first API;
  comparing the updated metadata to the initial metadata to determine whether the updated metadata is updated based on whether there is a difference greater than a threshold;
  in response to determining that the difference is not greater than the threshold, based on the first virtualized API endpoint, returning a static response to the call to the first API from within the test environment; and
  in response to receiving a third user request to generate a new virtualized API endpoint for the first API, searching an endpoint data repository for the new virtualized API endpoint, detecting an existing virtualized API endpoint, and generating a notification, to the third user request, that comprises a latest version of the first virtualized API endpoint for the first API.

5. The method of claim 4, wherein in response to determining that the difference is greater than the threshold, the method further comprises:
  based on the updated metadata, generating an updated template data structure for a request to the first API, and
  based on the updated template data structure, generating a second virtualized API endpoint for the first API.

6. The method of claim 5, wherein determining that the difference is greater than the threshold further comprises removing the first virtualized API endpoint from the endpoint data repository.

7. The method of claim 4, wherein generating the template data structure for the call to the first API further comprises parsing the initial metadata for the first API for a Uniform Resource Locators (URL) endpoint and a JavaScript Object Notation (JSON) payload.

8. The method of claim 4, further comprising:
  receiving a fourth user request to deploy the first API in a production environment; and
  in response to receiving the fourth user request, authenticating the first API for the production environment, comprising:
    receiving, from the production environment, an access token; and
    transmitting the access token to the production environment.

9. The method of claim 4, further comprising storing each virtualized API endpoint for each API within the endpoint data repository, wherein the endpoint data repository stores each API and a corresponding virtualized API endpoint.

10. The method of claim 4, further comprising:
  receiving, from the API source repository, a list of users associated with the first API;
  transmitting, to an API collection repository, the list of users associated with the first API; and
  generating a plurality of user accounts for each user on the list of users.

11. The method of claim 10, further comprising:
  detecting a change in the list of users associated with the first API, comprising:
    receiving, from the API source repository, an updated list of users, wherein the updated list of users comprises the list of users associated with the first API without users who have been removed;
    transmitting, to the API collection repository, the updated list of users; and
    removing a user account for a removed user.

12. The method of claim 4, further comprising generating an API request collection repository, wherein the API request collection repository comprises each user request, a user account associated with each user request, and an API associated with each user request.

13. The method of claim 4, further comprising receiving a time threshold, wherein the time threshold comprises an amount of time before automatically updating the endpoint data repository.

14. One or more non-transitory, computer-readable storage media storing instructions that when executed by one or more processors cause operations comprising:
  in response to receiving a first user request to generate a first virtualized API endpoint for a first API, based on initial metadata for the first API, generating a template data structure for a call to the first API;
  based on the template data structure, generating the first virtualized API endpoint for the first API;
  in response to receiving a second user request to deploy the first API in a test environment, based on the first virtualized API endpoint, returning a static response to the call to the first API from within the test environment; and
  in response to receiving a third user request to generate a new virtualized API endpoint for the first API, searching an endpoint data repository for the new virtualized API endpoint, detecting an existing virtualized API endpoint, and generating a notification, to the third user request, that comprises a latest version of the first virtualized API endpoint for the first API.

15. The one or more non-transitory, computer-readable storage media of claim 14, wherein in response to receiving the second user request to deploy the first API in the test environment further comprises:
  retrieving, from an API source repository, updated metadata for the first API; and
  comparing the updated metadata to the initial metadata to determine whether there is a difference greater than a threshold.

16. The one or more non-transitory, computer-readable storage media of claim 14, wherein generating the template data structure for the call to the first API further comprises parsing the initial metadata for the first API for a Uniform Resource Locators (URL) endpoint and a JavaScript Object Notation (JSON) payload.

17. The one or more non-transitory, computer-readable storage media of claim 14, wherein the instructions, when executed by the one or more processors, cause further operations comprising:
    receiving a fourth user request to deploy the first API in a production environment; and
    in response to receiving the fourth user request, authenticating the first API to the production environment by:
        receiving, from the production environment, an access token; and
        transmitting the access token, to the production environment.

18. The one or more non-transitory, computer-readable storage media of claim 14, wherein the instructions, when executed by the one or more processors, cause further operations comprising:
    receiving, from an API source repository, a list of users associated with the first API;
    transmitting, to an API collection repository, the list of users associated with the first API; and
    generating a plurality of user accounts for each user on the list of users.

19. The one or more non-transitory, computer-readable storage media of claim 18, further comprising:
    detecting a change in the list of users associated with the first API, comprising:
        receiving, from the API source repository, an updated list of users, wherein the updated list of users comprises the list of users associated with the first API without users who have been removed;
        transmitting, to the API collection repository, the updated list of users; and
        removing a user account for a removed user.

20. The one or more non-transitory, computer-readable storage media of claim 14, wherein the instructions, when executed by the one or more processors, cause further operations comprising storing each virtualized API endpoint for each API within the endpoint data repository, wherein the endpoint data repository stores each API and a corresponding virtualized API endpoint.

\* \* \* \* \*